(12) United States Patent
Van Nieuwenhuyze et al.

(10) Patent No.: US 9,351,164 B2
(45) Date of Patent: May 24, 2016

(54) SECURE NFC ROUTING

(71) Applicants:STMicroelectronics (Rousset) SAS, Rousset (FR); Proton World International N.V., Zaventem (BE)

(72) Inventors: Olivier Van Nieuwenhuyze, Wezembeek-Oppem (BE); Christophe Henri Ricard, Aix en Provence (FR)

(73) Assignees: STMicroelectronics (Rousset) SAS, Rousset (FR); Proton World International N.V., Diegem (BE)

( * ) Notice: Subject to any disclaimer, the term of this patent is extended or adjusted under 35 U.S.C. 154(b) by 0 days.

(21) Appl. No.: 14/633,913

(22) Filed: Feb. 27, 2015

(65) Prior Publication Data

US 2015/0271677 A1 Sep. 24, 2015

(30) Foreign Application Priority Data

Mar. 18, 2014 (FR) ...................................... 14 52225

(51) Int. Cl.
*H04W 12/08* (2009.01)
*H04L 29/06* (2006.01)
*H04W 12/06* (2009.01)
*H04W 12/12* (2009.01)
*H04W 4/00* (2009.01)

(52) U.S. Cl.
CPC ........... *H04W 12/08* (2013.01); *H04L 63/0492* (2013.01); *H04W 4/008* (2013.01); *H04W 12/06* (2013.01); *H04W 12/12* (2013.01)

(58) Field of Classification Search
None
See application file for complete search history.

(56) References Cited

U.S. PATENT DOCUMENTS

| | | | | |
|---|---|---|---|---|
| 8,713,585 B2* | 4/2014 | Teruyama | ............... | H04W 4/00 709/230 |
| 8,997,119 B2* | 3/2015 | Teruyama | ............... | H04W 4/00 709/230 |
| 9,071,971 B2* | 6/2015 | Caceres | ................ | H04W 12/08 |
| 9,179,301 B2* | 11/2015 | Huque | .................... | H04L 63/10 |
| 9,179,307 B2* | 11/2015 | Charles | .............. | G06Q 20/3229 |
| 9,185,561 B2* | 11/2015 | Huque | .................. | H04W 12/06 |
| 9,219,745 B2* | 12/2015 | Huque | ................ | H04L 63/1433 |
| 9,225,687 B2* | 12/2015 | Van Nieuwenhuyze | ... | G06F 21/6209 |
| 9,237,409 B2* | 1/2016 | Suzuki | ............... | G06Q 20/3278 |
| 2010/0027542 A1* | 2/2010 | Huang | .................... | H04L 12/18 370/390 |
| 2010/0227553 A1 | 9/2010 | Charrat et al. | | |
| 2010/0330904 A1* | 12/2010 | Stougaard | ............... | H04L 67/12 455/41.1 |
| 2013/0059566 A1 | 3/2013 | Huque et al. | | |
| 2013/0252545 A1* | 9/2013 | Leutgeb | ............... | H04B 5/0031 455/41.1 |
| 2014/0058937 A1* | 2/2014 | Watson | ................ | G06Q 20/204 705/41 |

FOREIGN PATENT DOCUMENTS

FR 2 969 341 A1 6/2012
FR 2 974 208 A1 10/2012

* cited by examiner

*Primary Examiner* — Tuan A Tran
(74) *Attorney, Agent, or Firm* — Seed IP Law Group PLLC (57) ABSTRACT

A processing device of an NFC device receives a request, initiated by a first application loaded in a memory of the NFC device, to modify one or more parameters of an NFC routing table of an NFC router of the NFC device. The NFC routing table has parameters indicating the devices to which NFC messages are to be routed. The processing device retrieves a first identifier associated with the application and transmits the first identifier to the NFC router. The NFC router, based on the first identifier, verifies whether or not the application is authorized to modify the routing table.

26 Claims, 4 Drawing Sheets

| RF | INDEX | PATTERN | MASK | PWR | TARGET | |
|----|-------|---------|--------|-----|--------|------|
| F | 1 | 00FFFF | FFFFFF | 1 | DH | ~302 |
| F | 1 | 000001 | 0000FF | 1 | SE | ~304 |
| F | 1 | 000002 | 0000FF | 1 | USIM | ~306 |

SECURE NFC ROUTING

BACKGROUND

1. Technical Field

The present disclosure relates to the field of NFC communications, and in particular to a method and device to modify NFC routing parameters.

2. Description of the Related Art

Mobile telephones and other types of mobile devices are increasingly being equipped with NFC (Near-Field-Communication) interfaces, which enable them to perform electromagnetic transponder functions in addition to their other functions. In particular, such devices are able to emulate the functions of an electromagnetic transponder, which could be of the contactless card type, or the contactless reader type. Such functionality for example enhances the mobile device, by allowing it to be used for various applications, for example as an electronic wallet allowing payments to be made for accessing services such as transport networks.

To emulate the operation of a contactless card, the mobile device is generally equipped with a contactless front-end integrated circuit (CLF), also called an NFC router. This router is equipped with a radio frequency (RF) transceiver front-end coupled to a low-range antenna to match the communication capabilities of an electromagnetic transponder. In some applications, a secure element (SE) or embedded secure element (eSE), either integrated in the mobile device or contained in a micro-circuit of the subscriber identification module (SIM), universal SIM (USIM) or μSD (micro secure digital), can be used to provide authentication.

The NFC router comprises an NFC routing table, which indicates to which hardware the NFC messages received by the NFC router should be routed. For example, some NFC messages, such as those relating to certain types of electronic payment, are to be routed to a secure element of the mobile device. To take one specific example, a VISA application may be running in communication with a Secure Element of a USIM. Other types of NFC messages are to be routed to the host processor of the mobile device. As an example, a MasterCard application may be running in HCE (Host Card Emulation), in other words in the Device Host environment (the names "VISA" and "MasterCard" may correspond to registered trademarks).

In view of the sensitive information that may pass through the NFC router, the NFC routing table should be secured against unauthorized modifications. However, existing solutions are ineffective in certain application environments.

BRIEF SUMMARY

In an embodiment, a method comprises: receiving by a processing device of an NFC device, a request, initiated by a first application loaded in a memory of the NFC device, to modify one or more parameters of an NFC routing table of an NFC router of the NFC device, the NFC routing table having parameters indicating the devices to which NFC messages are to be routed; retrieving by the processing device a first identifier associated with the first application; transmitting by the processing device the first identifier to the NFC router; and verifying by the NFC router, based on the first identifier, whether or not the first application is authorized to modify the routing table.

According to one embodiment, the first identifier is a digital signature of the first application.

According to one embodiment, verifying whether or not the first application is authorized to modify the routing table comprises accessing by the NFC router a list of identifiers of applications authorized to modify the routing table, and verifying that the first identifier is on the list.

According to one embodiment, the method comprises modifying the list of identifiers during a software update of the NFC device.

According to one embodiment, the method comprises modifying the list of identifiers during a secure update performed by a secure element of the NFC device.

According to one embodiment, the processing device communicates with the NFC router using a first message format, and transmits the first identifier to the NFC router using a second message format different to the first message format.

According to one embodiment, the first message format uses a first header, and the second message format uses a second header different to the first header.

According to one embodiment, the processing device comprises a communications driver adapted to communicate with the NFC router, the communications driver communicating with the NFC router using a first transmission protocol, and transmitting the first identifier to the NFC router using a second transmission protocol different to the first transmission protocol.

According to one embodiment, the second transmission protocol is different from the first transmission protocol in that it comprises a transmission rule that cannot be duplicated by the processing device.

According to one embodiment, the first transmission protocol provides a stop condition between consecutive messages, and the second transmission protocol comprises transmitting two consecutive messages with no stop condition between them.

In an embodiment, an NFC device comprises: a processing device; and an NFC router comprising one or more memories storing an NFC routing table and a list of identifiers of one or more applications authorized to modify the NFC routing table, the NFC router being adapted to: receive a first identifier of a first application loaded in a memory of the processing device and wishing to modify one or more parameters of the NFC routing table; and verify, based on the first identifier, whether or not the first application is authorized to modify the routing table.

According to one embodiment, the first identifier is a digital signature of the application.

In an embodiment, a method comprises: receiving, by a processing device of a near field communication (NFC) device, a request, initiated by a first application loaded in a memory of the NFC device, to modify one or more parameters of an NFC routing table of an NFC router of the NFC device, the NFC routing table having parameters indicating devices to which NFC messages are to be routed; retrieving, by the processing device, a first identifier associated with the first application; transmitting, by the processing device, the first identifier to the NFC router; and verifying, by the NFC router, based on the first identifier, whether the first application is authorized to modify the routing table. In an embodiment, the first identifier is a digital signature of the application. In an embodiment, verifying whether the first application is authorized to modify the routing table comprises accessing by the NFC router a list of identifiers of applications authorized to modify the routing table, and verifying that the first identifier is on the list. In an embodiment, the method comprises modifying said list of identifiers during a software update of said NFC device. In an embodiment, the method comprises modifying said list of identifiers during a secure update performed by a secure element of the NFC device. In an embodiment, the method comprises transmitting messages between the processing device and the NFC router which are related to NFC communications using a first message format, and transmitting the first identifier from the processing device to the NFC router using a second message format different from the first message format. In an embodiment, the first message format uses a first header, and the second message format uses a second header different from the first header. In an embodiment, wherein the processing device comprises a communications driver adapted to communicate with the NFC router, and wherein the communications driver communicates with the NFC router using a first communication protocol to transmit messages related to NFC communications, and transmits the first identifier to the NFC router using a second communication protocol different from the first communication protocol. In an embodiment, the second communication protocol is different from the first communication protocol in that it comprises a transmission rule that cannot be duplicated by the processing device. In an embodiment, the first communication protocol includes a stop condition between consecutive messages, and the second communication protocol transmits two consecutive messages without a stop condition between the two consecutive messages.

In an embodiment, a near field communication (NFC) router comprises: one or more memories, which, in operation, store a near field communication (NFC) routing table; and circuitry, which, in operation: determines a routing of a received NFC message based on the routing table; and determines whether a received application identifier associated with a request to modify the routing table is associated with an application authorized to modify the routing table. In an embodiment, the received application identifier is a digital application signature. In an embodiment, in operation, the circuitry accesses a list of identifiers of authorized applications stored in the one or more memories to determine whether the received application identifier is associated with an application authorized to modify the routing table. In an embodiment, in operation, the circuitry routes received NFC messages using a first message format and processes received application identifiers using a second message format different from the first message format. In an embodiment, the first message format uses a first header, and the second message format uses a second header different from the first header. In an embodiment, in operation, the circuitry processes NFC messages using a first communication protocol and receives application identifiers using a second communication protocol different from the first communication protocol. In an embodiment, the first communication protocol includes a stop condition between consecutive messages, and the second communication protocol transmits an application identifier using two consecutive messages without a stop condition between the two consecutive messages.

In an embodiment, a system comprises: processing circuitry configured to execute one or more applications; and a near field communication (NFC) router including one or more memories configured to store an NFC routing table and a list of identifiers of one or more applications authorized to modify the NFC routing table, wherein the NFC router is configured to respond to a received application identifier associated with a request to modify the NFC routing table by determining whether the received application identifier is listed in the list of identifiers of applications authorized to modify the NFC routing table. In an embodiment, the processing circuitry and the NFC router are configured to process messages related to received NFC communications using a first message format and the processing circuitry is configured to transmit application identifiers associated with requests to modify the routing table to the NFC router using a second message format different from the first message format. In an embodiment, the first message format uses a first header and the second message format uses a second header different from the first header. In an embodiment, the processing circuitry and the NFC router are configured to transmit messages related to NFC communications using a first communication protocol and the processing circuitry is configured to transmit application identifiers associated with requests to modify the routing table to the NFC router using a second communication protocol different from the first communication protocol. In an embodiment, the first communication protocol includes a stop condition between consecutive messages, and the second communication protocol transmits an application identifier using two consecutive messages without a stop condition between the two consecutive messages.

In an embodiment, a non-transitory computer-readable medium's contents cause a near field communication (NFC) device to perform a method, the method comprising: responding to a request of an application to modify one or more parameters of an NFC routing table of an NFC router of the NFC device, by retrieving an application identifier associated with the application; transmitting the identifier to the NFC router; and determining, based on the transmitted identifier and a list of identifiers stored in a memory of the NFC router, whether the requesting application is authorized to modify the routing table. In an embodiment, the method comprises processing messages related to NFC communications using a first message format, and transmitting the identifier to the NFC router using a second message format different from the first message format. In an embodiment, the method comprises processing messages related to NFC communications using a first communication protocol and transmitting the identifier to the NFC router using a second communication protocol different from the first communication protocol. In an embodiment, the first communication protocol includes a stop condition between consecutive messages and the second communication protocol transmits an application identifier using two consecutive messages without a stop condition between the two consecutive messages.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

In the following description, numerous specific details are given to provide a thorough understanding of example embodiments. The embodiments can be practiced without one or more of the specific details, or with other methods, components, materials, etc. In other instances, well-known structures, materials, or operations, such as, for example, integrated circuits, memories, SIM cards, drivers, bus systems, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
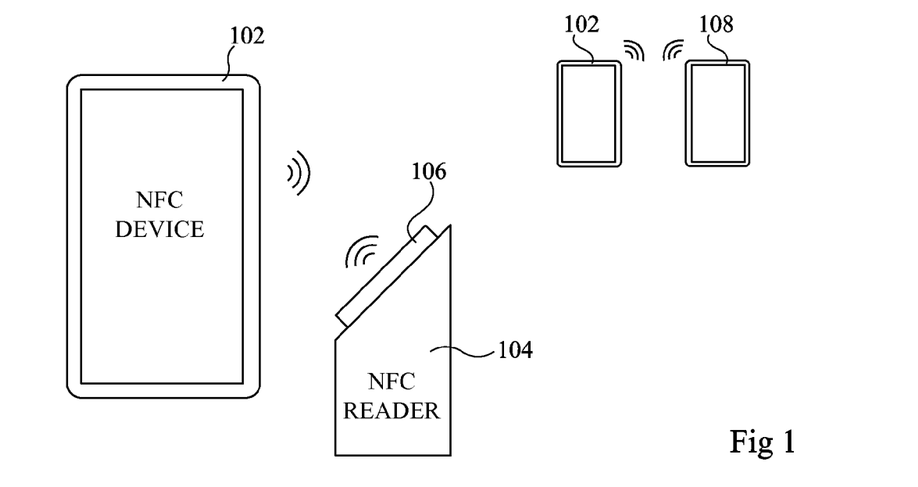
FIG. 1 schematically illustrates an NFC device capable of NFC communications according to an example embodiment of the present disclosure.

FIG. 1 schematically illustrates an NFC device 102, which is a device capable of NFC communications. For example, the device 102 is a mobile device, such as a mobile telephone, smart phone, tablet computer, digital media player or the like, equipped with NFC circuitry (not illustrated in FIG. 1).

On the left-hand side in FIG. 1, the NFC device 102 is shown in communication with a reader 104, comprising an NFC transponder 106. For example, the reader 104 is positioned at an entry barrier of a restricted area, such as a transport network or the like. Alternatively, the reader 104 is positioned at a point of sale in a shop or restaurant. When used with such a reader, the NFC circuitry of the NFC device 102 for example operates in a tag emulation mode.

On the right-hand side in FIG. 1, the NFC device 102 is shown in communication with another NFC device 108 via an NFC interface. For example, like NFC device 102, the NFC device 108 is a device capable of NFC communications, which could be a mobile device such as a mobile telephone, smart phone, tablet computer, digital media player or the like, equipped with NFC circuitry. When communicating with another NFC device, the NFC circuitry of the NFC device 102 for example operates in a peer-to-peer mode, and communications are initiated by either one of the NFC devices.

Figure 2:
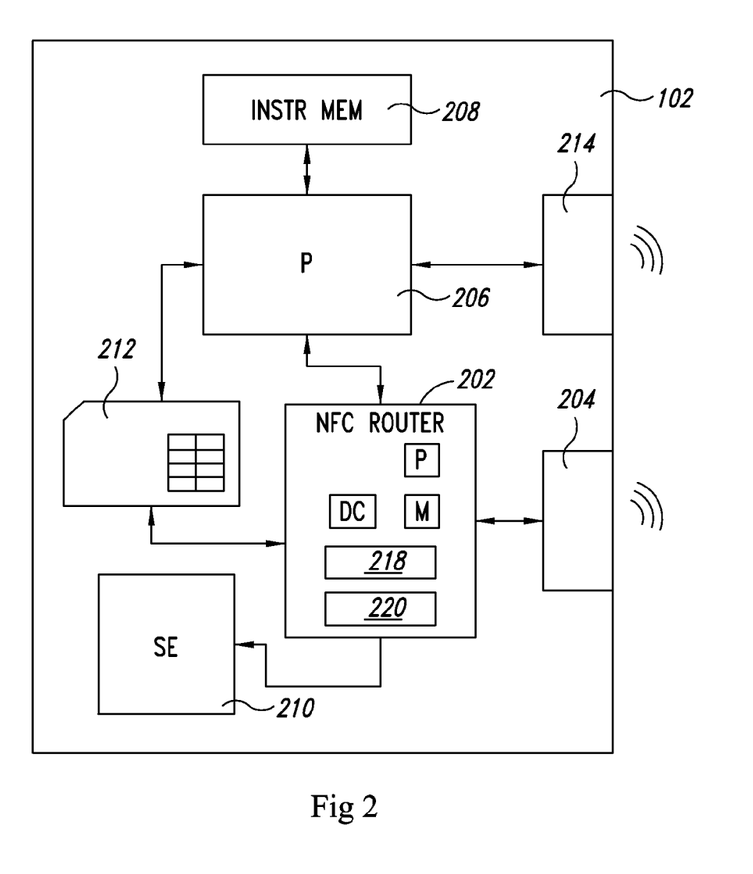
FIG. 2 schematically illustrates the NFC device of FIG. 1 in more detail according to an example embodiment of the present disclosure.

FIG. 2 schematically illustrates the NFC device 102 in more detail according to an example embodiment.

As illustrated, the device 102 for example comprises an NFC router (NFC ROUTER) 202, also known in the art as a contactless front-end (CLF). The NFC router 202 is coupled to an NFC antenna 204, and together the router 202 and antenna 204 provide NFC circuitry for emulating the behavior of an NFC transponder.

The NFC router 202 is also for example coupled to a host processing device (P) 206 of the NFC device 102. The device 206 for example comprises one or more processors under the control of instructions stored in an instruction memory (INSTR MEM) 208. The instruction memory 208 is for example a Flash memory, and stores one or more applications (not illustrated in FIG. 1) that have been loaded on the device. The NFC router 202 is also for example coupled to other devices, of which a secure element (SE) 210 and USIM (Universal Subscriber Identification Module) circuit 212 are illustrated. The secure element 210 is for example an embedded SE (eSE), and the USIM circuit 212 is for example coupled to the NFC router via an SWP (single wire protocol) link, and is additionally coupled to the host processing device 206.

The host processing device 206 is also for example coupled to one or more antennas 214, which for example permit telecommunications within a cellular network, and/or wireless communications according to other standards such as Wi-Fi, Bluetooth etc.

The NFC router 202 for example comprises one or more memories storing an NFC routing table 218 and a list 220 of identifiers of applications authorized to modify the NFC routing table. The NFC routing table 218 defines rules for processing NFC messages received by the NFC router 202. In particular, the messages may be considered to be targeted to either the processing device 206 or to one of the secure elements 210, 212. The NFC router 202 may comprise circuitry such as one or more processors P, one or more memories M, discrete circuitry DC, such as one or more comparators, logic gates, etc., which may be used alone or in various combinations to implement various functionality of the NFC router 202.

Figure 3:
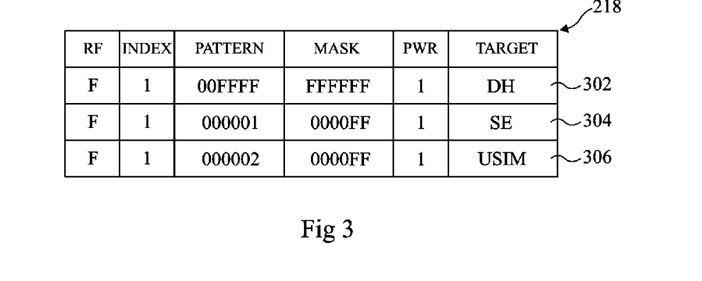
FIG. 3 schematically represents a routing table of an NFC router according to an example embodiment of the present disclosure.

FIG. 3 represents an example of the routing table 218 of the NFC router 202 according to an example embodiment. This table is for example implemented as a look up table (LUT).

The table 218 comprises five columns of parameters representing inputs to a table which include: an RF technology column (RF) indicating the NFC RF technology of the communication; an index column (INDEX), pattern column (PATTERN) and mask column (MASK) indicating conditions relating to part of the input message, where the index indicates the byte of the message to be considered, the pattern defines certain patterns of bits of the payload, and the mask indicates those bits that are to be taken into account; and a power field (PWR) indicating whether the device is switched on, switched off or its battery is off. The right-hand column of FIG. 3 comprises a parameter, for each row of the table, indicating to which target device the corresponding message should be routed.

In the example of FIG. 3, the index is at "1" for each row, indicating for example that a first byte of the payload of the message is to be considered. In a first row 302 of the table, the pattern field is a hexadecimal pattern "00FFFF", the mask is equal to "FFFFFF", meaning that the whole pattern is to be considered, and the target is the device host (DH), in other words the processing device 206. In a second row 304 of the table, the pattern field is a hexadecimal pattern "000001", the mask is equal to "0000FF", meaning that only the last two hexadecimal values are to be considered, and the target is the secure element 210. In the third row 306 of the table, the pattern field is a hexadecimal pattern "000002", the mask is equal to "0000FF", again meaning that only the last two hexadecimal values are to be considered, and the target is the USIM 212.

FIG. 3 provides just one example of an NFC routing table based on pattern recognition. The embodiments described herein may be applied to a wide range of different routing tables, in which routing is defined by one or more of:

the RF technology used for the NFC message;
the RF protocol used for the NFC message;
pattern recognition in the NFC message;

select command, for example according to the standard ISO7816 based on an AID (application ID) value.

An unauthorized modification of the routing table 218 could for example cause sensitive messages intended for the secure element 210 or the USIM 212 to be routed to the host processing device, leading to a potential security breach, or to a denial of service (DoS), which end-users generally find very dissatisfactory.

Figure 4:
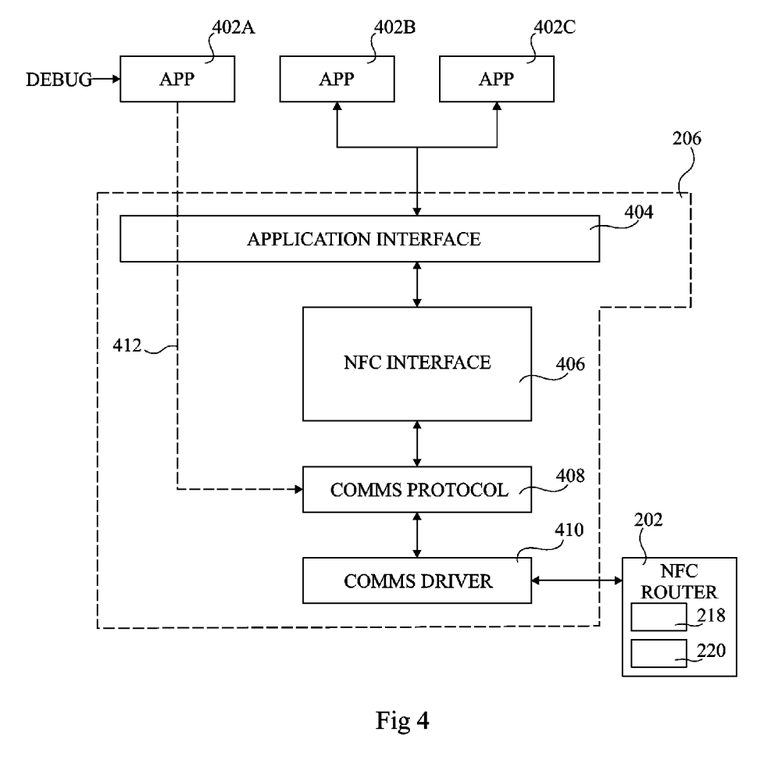
FIG. 4 schematically represents components of an NFC device according to an example embodiment of the present disclosure.

FIG. 4 schematically represents elements of the NFC device 102 for performing NFC functions. The NFC device 102 for example stores in its instruction memory 208 three applications 402A, 402B and 402C, which comprise NFC functionality. Such an application, which for example runs in the Java environment using a JVM (Java Virtual Machine), and may be referred to in certain environments as a Wallet. For example, the applications 402A, 402B and 402C involve NFC card emulation functions for emulating a payment card or security badge, card reader functions for reading an NFC tag, and/or peer-to-peer functions permitting communications with another NFC device.

The applications 402A, 402B and 402C may be executed by the processing device 206, which for example comprises the following functional elements for interfacing with the NFC router 202: an application interface (APPLICATION INTERFACE) 404, an NFC interface (NFC INTERFACE) 406, a communications protocol module (COMMS PROTOCOL) 408 and a communications driver (COMMS DRIVER) 410 coupled to the NFC router 202. These functional elements may be implemented in hardware, in software, in firmware, etc., and various combinations thereof. The application interface 404 for example corresponds to a software framework that has knowledge of the various applications stored on the device, and allows these applications to be called. The communications protocol module 408 applies a protocol for the exchanges with the NFC router 202, and the communications driver 410 applies a transmission protocol for transmitting NFC frames over the physical link to the NFC router 202. In some embodiments the driver 410 uses a I2C interface. The NFC interface 406 for example provides an interface between the applications and the modules 408 and 410 responsible for communicating with the NFC router 202.

Some protection against unauthorized modification of the routing table 218 may be implemented by the NFC interface 406, which can prevent certain applications from performing such a modification. However, in some cases it may be possible to bypass the NFC interface 406. For example, as shown by a dashed arrow 412 in FIG. 4, a malware may cause a debug mode to be entered, via the application 402A, such that this application can communicate directly with the communications protocol module 408, bypassing the NFC interface 406. Therefore, according to an embodiment described herein, the list 220 of authorized applications stored by the NFC router 202 provides an alternative or additional protection mechanism, as will now be described in more detail with reference to FIG. 5.

Figure 5:
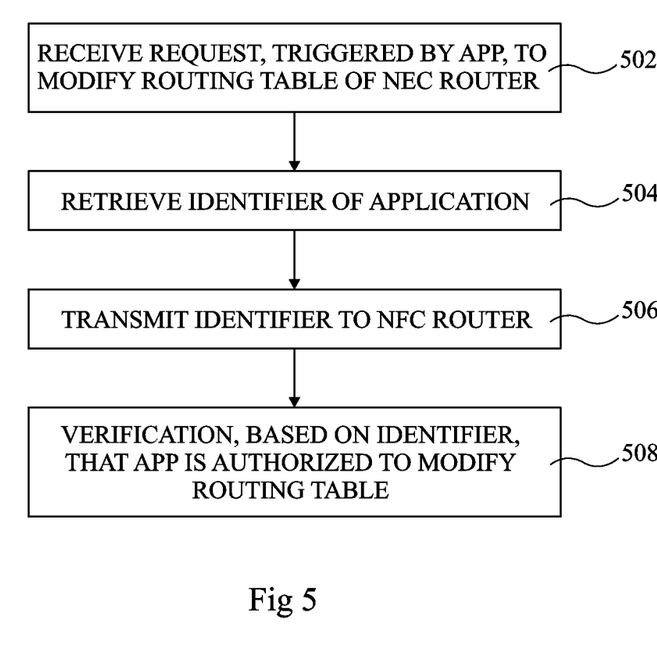
FIG. 5 is a flow diagram illustrating operations in a method of updating a parameter of an NFC routing table according to an example embodiment of the present disclosure.

FIG. 5 is a flow diagram showing operations in a method of preventing unauthorized modification of the NFC routing table 218 according to an example embodiment. It is assumed that the application 402A of FIG. 4 has made a request to modify one or more parameters of the routing table 218.

In a first operation 502, the request to modify the routing table of the NFC router is received by the communications protocol module 408 of the processing device 206. This request is for example received via the NFC interface 406 of the processing device 206. Alternatively, as described above, in the case of malware present on the device, the NFC interface 406 may be bypassed, the request being received by the communications protocol module 408 directly from the application.

In a subsequent operation 504, an identifier of the application is retrieved by the communications protocol module 408. For example, module 408 requests from the NFC interface 406 a signature of the application that initiated the request. Such a signature is for example unique to the application, and is attributed to the application by an operating system provider/handset maker of the NFC device 102 to permit it to be installed on the device.

In a subsequent operation 506, the identifier is transmitted to the NFC router 202, via the communications driver 410, in the form of a verification request. Furthermore, as will be described in more detail below, in some embodiments this request can be further secured by adapting the message transmission protocol, so that the NFC router 202 can check that the verification request originates from the communications protocol module 408.

In a subsequent operation 508, the NFC router 202 verifies, based on the identifier, whether the application is authorized to modify the routing table 218.

As mentioned above, the NFC router 202 for example stores in a memory a list 220 of the signatures of all authorized applications. This list may for example only be modified during a secure session, for example during a software update provided by a software provider of the NFC device. In particular, if an application developer wishes that their application is authorized to modify the routing table, it for example requests that the handset maker/operating system provider adds the signature of their application to the list 220 of authorized applications. This modification can then be made during a subsequent software update, which is performed during a secure session, for example protected using a MAC (message authentication code). Furthermore, in some embodiments the list can additionally or alternatively be modified during a secure update performed by a secure element of the NFC device, for example during a secure administration session.

If the signature of the application is on the list of identifiers of authorized applications, the NFC router 202 for example permits the modification of the routing table, whereas if the signature is not on the list, the NFC router 202 for example informs the communications protocol 408 of the negative response, and the modification request is denied.

Figure 6:
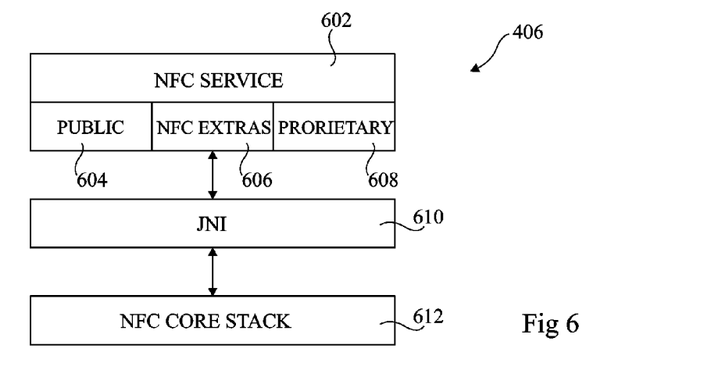
FIG. 6 illustrates an NFC interface of FIG. 4 in more detail according to an example embodiment.

FIG. 6 illustrates elements of the NFC interface 406 in more detail according to an example embodiment in which the NFC device uses an Android operating system, which is for example Android KitKat (the names "Android" and "Android KitKat" may correspond to registered trademarks).

The interface 406 for example comprises an NFC service module (NFC SERVICE) 602, having a public sub-module (PUBLIC) 604, which supports NFC features available for all applications, including routing mechanisms, an "NFC EXTRAS" sub-module 606, which supports features related to secure elements providing restricted access, and a proprietary sub-module (PROPRIETARY) 608. The routing mechanisms are for example not protected by the security associated with the NFC EXTRAS sub-module 606, leading to a potential weakness that could allow unauthorized modification of the routing table.

The NFC service module 602 communicates with a JNI (Java Native Interface), which provides an interface between the application interface 404 and the Native World, in other words kernels interpreted directly by the processing device 206. The JNI 610 in turn communicates with an NFC core stack (NFC CORE STACK) 612, which provides operation management of NFC operations.

Figure 7:
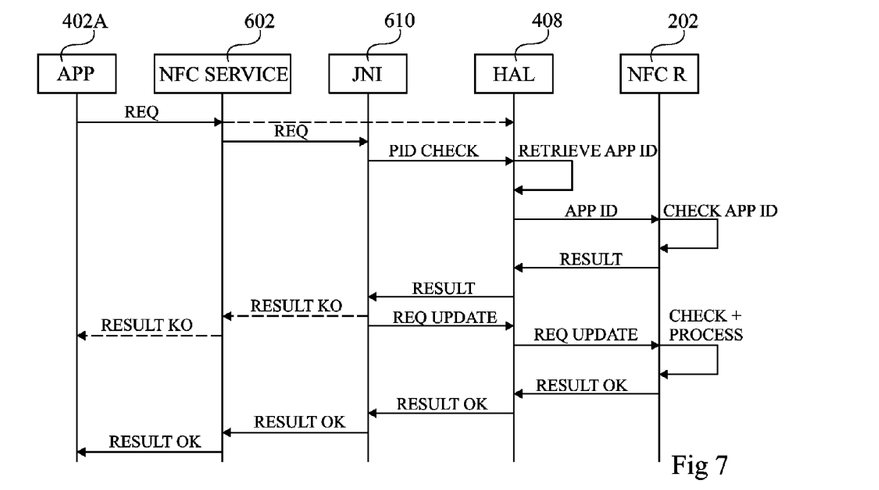
FIG. 7 is a diagram representing interactions between an application of the NFC device and an NFC router according to an example embodiment of the present disclosure.

FIG. 7 illustrates an example of communications between the application (APP) 402A requesting to modify a parameter of the routing table, and the NFC router (NFC R) 202, via the NFC service module (NFC SERVICE) 602, the JNI 610 and the communications interface 408 in the case that it is a HAL (hardware abstraction layer) interface.

The application 402A initiates the process by making a request (REQ) to the NFC service module 602 to update a routing parameter. The request is forwarded by the module 602, along with the application PID (process identifier), to the JNI 610. The process identifier PID for example accompanies the request from the application 402A and indicates which application made the request. The JNI then initiates a name check (PID CHECK), to be performed by the HAL 408. This name check is transmitted to the HAL 408, via the NFC core stack 612 (not represented in FIG. 7).

Alternatively, as shown by a dashed arrow in FIG. 7, in some circumstances, for example in the case of a malware present on the NFC device, a request for a name check could be transmitted by the application 402A directly to the HAL 408, bypassing the NFC services module 602 and the JNI 610.

The HAL 408 receives the request, and retrieves from the NFC service module 602 an application identifier (APP ID) associated with the application. For example, the application identifier is the digital signature of the application.

The HAL 408 then transmits the application identifier to the NFC router 202, via the communications driver 410 (not represented in FIG. 7). The NFC router 202 verifies whether the application identifier corresponds to an authorized application (CHECK APP ID), and returns the result (RESULT) to the HAL 408. The result is forwarded by the HAL 408 to the JNI 610.

In the case that the result is positive, e.g., the application identifier APP ID was on a list of authorized applications, the JNI 610 then transmits the request to update the routing table (REQ UPDATE) to the HAL 408, which in turn forwards this request to the NFC router 202. The NFC router 202 for example checks that the application identifier has been verified in relation to this request and then processes the request and updates the parameter of the routing table as indicated in the request. A confirmation signal (RESULT OK) is for example transmitted by the NFC router 202 to the HAL 408, which is in turn forwarded by the HAL 408, JNI 610, and NFC service module 602 to the application 402A.

Alternatively, in the case that the result provided by the NFC router and received by the JNI 610 is negative, e.g., the application is not authorized to modify the routing table, the JNI 610 for example sends a failure message (RESULT KO) to the NFC services module 602, which in turn forwards this result to the application 402.

As mentioned above, the request for verification of the application identifier, which in FIG. 7 is transmitted by the HAL 408 to the NFC router, for example uses a unique protocol, distinct from the normal protocol used for messages between the communications protocol module 408 and the NFC router 202. This for example provides a further verification that the module 408 has not been bypassed. For example, the NFC frame of a standard message has the following elements:

MT+GID/Conn ID, which represents the message type, group identifier, and/or the connection identifier targeted by the message;

OID/RFU, (Object Identifier/Reserved for Future Use), which represents complementary information relating to the message type and/or targeted connection;

LEN, which represents the length of the message; and a payload containing the data to be conveyed by the message.

According to the embodiments described herein, this standard NFC frame is for example updated to comprise one of two additional headers, one additional header being used for standard messages, and another different additional header being used for requests for verification of an application identifier. For example, the additional header used for a normal frame is "0x01", while the additional header used for an identifier verification is "0x02".

Additionally or alternatively, the communications protocol module 408 causes the communications driver 410 to modify its transmission protocol in the case of a request for verification of an application identifier. In this case, the driver 410 for example retrieves the application identifier from the NFC service module 602, in addition to or instead of the HAL 408. In an embodiment, the modification of the transmission protocol for example involves applying a new transmission rule that cannot be duplicated by any higher layer application. In an embodiment, the NFC router is for example the only device capable of interpreting and processing messages transmitted according to this new transmission rule.

According to one example, the communications driver 410 applies the I2C transmission protocol, and the request is transmitted over two consecutive frames not separated by a stop condition, as will now be described in more detail with reference to FIG. 8.

Figure 8:
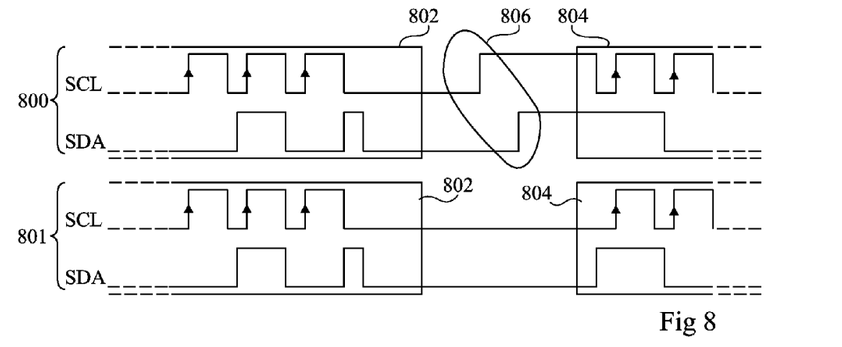
FIG. 8 is a timing diagram showing signals of a communications protocol with an NFC router according to an example embodiment of the present disclosure.

FIG. 8 is a timing diagram showing an example of some of the signals on a clock line SCL and a data line SDA between the driver 410 and the NFC router 202 according to the I2C protocol in the case of a standard communication 800, and in the case of a communication 801 requesting verification of an application identifier.

For the standard communication 800, two consecutive frames 802, 804 are separated by a stop condition 806, which for example corresponds to a rising edge on the data line SDA while the clock line SCL is high.

For the communication 801 requesting verification of an application identifier, the stop condition between the frames 802 and 804 is removed. It should be noted that such a modification of the protocol will not impact other slaves present on the line, because it will be transparent to them, and the targeted slave, e.g., the NFC router, is for example adapted to manage frames modified in this way.

An advantage of embodiments described herein is that a robust protection mechanism is provided against unauthorized modifications to the NFC routing table of an NFC router.

Having thus described at least one illustrative embodiment, various alterations, modifications and improvements will readily occur to those skilled in the art.

For example, while detailed embodiments have been described in relation to the Android operating system, it will be apparent to those skilled in the art that the teaching herein could be applied to other NFC device operating systems, such as iOS (the name "iOS" may correspond to a registered trademark).

Some embodiments may take the form of or include computer program products. For example, according to one embodiment there is provided a computer readable medium including a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some of the systems and/or modules and/or circuits and/or blocks may be implemented or provided in other manners, such as at least partially in firmware and/or hardware, including, but not limited to, one or more application-specific integrated circuits (ASICs), digital signal processors, discrete circuitry, logic gates, shift registers, standard integrated circuits, state machines, look-up tables, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
 receiving, by a processing device of a near field communication (NFC) device, a request, initiated by a first application loaded in a memory of the NFC device, to modify one or more parameters of an NFC routing table of an NFC router of the NFC device, the NFC routing table having parameters indicating devices to which NFC messages are to be routed;
 retrieving, by the processing device, a first identifier associated with the first application;
 transmitting, by the processing device, the first identifier to the NFC router; and
 verifying, by the NFC router, based on the first identifier, whether the first application is authorized to modify the routing table.

2. The method of claim 1 wherein the first identifier is a digital signature of the application.

3. The method of claim 1 wherein verifying whether the first application is authorized to modify the routing table comprises accessing by the NFC router a list of identifiers of applications authorized to modify the routing table, and verifying that the first identifier is on the list.

4. The method of claim 3, comprising modifying said list of identifiers during a software update of said NFC device.

5. The method of claim 4, comprising modifying said list of identifiers during a secure update performed by a secure element of the NFC device.

6. The method of claim 1, comprising transmitting messages between the processing device and the NFC router which are related to NFC communications using a first message format, and transmitting the first identifier from the processing device to the NFC router using a second message format different from the first message format.

7. The method of claim 6 wherein the first message format uses a first header, and the second message format uses a second header different from the first header.

8. The method of claim 1 wherein the processing device comprises a communications driver adapted to communicate with the NFC router, and wherein the communications driver communicates with the NFC router using a first communication protocol to transmit messages related to NFC communications, and transmits the first identifier to the NFC router using a second communication protocol different from the first communication protocol.

9. The method of claim 8 wherein the second communication protocol is different from the first communication protocol in that it comprises a transmission rule that cannot be duplicated by the processing device.

10. The method of claim 8 wherein the first communication protocol includes a stop condition between consecutive messages, and the second communication protocol transmits two consecutive messages without a stop condition between the two consecutive messages.

11. A near field communication (NFC) router, comprising:
 one or more memories, which, in operation, store a near field communication (NFC) routing table; and
 circuitry, which, in operation:
  determines a routing of a received NFC message based on the routing table; and
  determines whether a received application identifier associated with a request to modify the routing table is associated with an application authorized to modify the routing table.

12. The NFC router of claim 11 wherein the received application identifier is a digital application signature.

13. The NFC router of claim 11 wherein, in operation, the circuitry accesses a list of identifiers of authorized applications stored in the one or more memories to determine whether the received application identifier is associated with an application authorized to modify the routing table.

14. The NFC router of claim 11 wherein, in operation, the circuitry routes received NFC messages using a first message format and processes received application identifiers using a second message format different from the first message format.

15. The NFC router of claim 14 wherein the first message format uses a first header, and the second message format uses a second header different from the first header.

16. The NFC router of claim 11 wherein, in operation, the circuitry processes NFC messages using a first communication protocol and receives application identifiers using a second communication protocol different from the first communication protocol.

17. The NFC router of claim 16 wherein the first communication protocol includes a stop condition between consecutive messages, and the second communication protocol transmits an application identifier using two consecutive messages without a stop condition between the two consecutive messages.

18. A system, comprising:
 processing circuitry configured to execute one or more applications; and
 a near field communication (NFC) router including one or more memories configured to store an NFC routing table and a list of identifiers of one or more applications authorized to modify the NFC routing table, wherein the NFC router is configured to respond to a received application identifier associated with a request to modify the NFC routing table by determining whether the received application identifier is listed in the list of identifiers of applications authorized to modify the NFC routing table.

19. The system of claim 18 wherein the processing circuitry and the NFC router are configured to process messages related to received NFC communications using a first message format and the processing circuitry is configured to transmit application identifiers associated with requests to modify the routing table to the NFC router using a second message format different from the first message format.

20. The system of claim 19 wherein the first message format uses a first header and the second message format uses a second header different from the first header.

21. The system of claim 18 wherein the processing circuitry and the NFC router are configured to transmit messages related to NFC communications using a first communication protocol and the processing circuitry is configured to transmit application identifiers associated with requests to modify the routing table to the NFC router using a second communication protocol different from the first communication protocol.

22. The system of claim 21 wherein the first communication protocol includes a stop condition between consecutive messages, and the second communication protocol transmits an application identifier using two consecutive messages without a stop condition between the two consecutive messages.

23. A non-transitory computer-readable medium whose contents cause a near field communication (NFC) device to perform a method, the method comprising:

responding to a request of an application to modify one or more parameters of an NFC routing table of an NFC router of the NFC device, by
  retrieving an application identifier associated with the application;
  transmitting the identifier to the NFC router; and
  determining, based on the transmitted identifier and a list of identifiers stored in a memory of the NFC router, whether the requesting application is authorized to modify the routing table.

24. The medium of claim 23 wherein the method comprises processing messages related to NFC communications using a first message format, and transmitting the identifier to the NFC router using a second message format different from the first message format.

25. The medium of claim 23 wherein the method comprises processing messages related to NFC communications using a first communication protocol and transmitting the identifier to the NFC router using a second communication protocol different from the first communication protocol.

26. The medium of claim 25 wherein the first communication protocol includes a stop condition between consecutive messages and the second communication protocol transmits an application identifier using two consecutive messages without a stop condition between the two consecutive messages.

* * * * *